US005770528A

United States Patent [19]
Mumick et al.

[11] Patent Number: 5,770,528
[45] Date of Patent: Jun. 23, 1998

[54] METHYLATED HYDROXYPROPYLCELLULOSE AND TEMPERATURE RESPONSIVE PRODUCTS MADE THEREFROM

[75] Inventors: Pavneet Singh Mumick; Yihua Chang, both of Appleton, Wis.

[73] Assignee: Kimberly-Clark Worldwide, Inc., Neenah, Wis.

[21] Appl. No.: 775,223

[22] Filed: Dec. 31, 1996

[51] Int. Cl.$^6$ .............................. A61F 13/00; A61F 13/20; C08B 11/08
[52] U.S. Cl. ..................... 442/59; 106/182.1; 106/187.1; 162/177; 252/104; 442/153; 442/164; 536/91; 536/95; 536/99; 604/375
[58] Field of Search .............................. 106/182.1, 187.1; 162/177; 252/104; 442/153, 164, 59; 536/91, 95, 99; 604/375

[56] References Cited

U.S. PATENT DOCUMENTS

| | | |
|---|---|---|
| 2,265,913 | 12/1941 | Lilienfeld . |
| 2,306,451 | 12/1942 | Lilienfeld . |
| 2,831,852 | 4/1958 | Savage . |
| 3,388,082 | 6/1968 | Rodgers et al. . |
| 3,709,876 | 1/1973 | Glomski et al. . |
| 3,839,319 | 10/1974 | Greminger et al. . |
| 3,926,951 | 12/1975 | Lindenfors . |
| 4,002,171 | 1/1977 | Taft . |
| 4,096,325 | 6/1978 | Teng et al. ............................... 536/91 |
| 4,309,469 | 1/1982 | Varona . |
| 4,537,807 | 8/1985 | Chan et al. . |
| 5,196,470 | 3/1993 | Anderson et al. . |
| 5,252,332 | 10/1993 | Goldstein . |
| 5,464,545 | 11/1995 | Isharani et al. . |
| 5,509,913 | 4/1996 | Yei ........................................ 604/364 |
| 5,576,364 | 11/1996 | Isaac et al. . |

OTHER PUBLICATIONS

Stafford et al., "Temperature Dependence of the Disintegration Times of Compressed Tablets Containing Hydroxypropylcellulose as Binder", *J. Pharm. Pharmac.*, vol. 30, pp. 1–5 (1978).

Chowdhury et al., "Direct Observation of the Gelation of Rodlike Polymers", *American Chemical Society*, Polymeric Science and Engineering, pp. 1045–1052 (1988).

Carlsson et al. "Thermal Gelation of Nonionic Cellulose Ethers and Ionic Surfactants in Water", *Colloids and Surfaces*, vol. 47, pp. 147–165 (1990).

Nagara et al., "Temperature–Viscosity Relationships of Aqueous Solutions of Cellulose Fibers", *Kobunishi Ronbunshu*, vol. 38(3), pp. 133–137 (1981).

*Primary Examiner*—James C. Cannon
*Attorney, Agent, or Firm*—Jones & Askew, LLP

[57] ABSTRACT

The present invention is directed to a method of producing methylated hydroxypropylcellulose (m-HPC). By controlling the degree of methylation, one can manipulate the lower critical solution temperature (LCST) of the m-HPC polymer to below room temperature and thereby stabilize the polymer in water above about 30° C. The present invention is also directed to binder compositions, fibrous substrates, water-dispersible products and thermoformable products containing the m-HPC polymer.

38 Claims, No Drawings

METHYLATED HYDROXYPROPYLCELLULOSE AND TEMPERATURE RESPONSIVE PRODUCTS MADE THEREFROM

FIELD OF THE INVENTION

The present invention is directed to a method of making ion and temperature sensitive polymeric materials based on methylated hydroxypropylcellulose (m-HPC) and their applicability as binder compositions. The present invention is further directed to fiber-containing fabrics and webs comprising ion sensitive binder compositions and their applicability in water-dispersible personal care products. The present invention is also directed to thermoformable articles comprising methylated hydroxypropylcellulose.

BACKGROUND OF THE INVENTION

For many years the problem of disposability has plagued industries which involve disposable diapers, incontinent garments and feminine care products. While much headway has been made in addressing this problem, one of the weak links has been the inability to create an economical coherent fibrous web which will readily dissolve or disintegrate in water. See, for example, U.K. patent disclosure 2,241,373 and U.S. Pat. No. 4,186,233. Without such a product, the ability of the user to dispose of the product by flushing it down the toilet is greatly reduced, if not eliminated. Furthermore, the ability of the product to disintegrate in a landfill is quite limited because a large portion of the product components, which may well be biodegradable or photodegradable, are encapsulated in or bound together by plastic which degrades slowly over a long period of time, if at all. Accordingly, if the plastic disintegrated in the presence of water, the internal components could degrade as a result of the rupture of the plastic encapsulation or binding.

Disposable diapers, feminine care products and adult incontinent care products usually contain a body side liner which must rapidly pass fluids, such as urine or menses, so that the fluid may be absorbed by an absorbent core of the product. Typically, the body side liner is a coherent fibrous web which desirably possesses a number of characteristics such as softness and flexibility. The fibrous web of the body side liner material is typically formed by wet or dry (air) laying a generally random plurality of fibers and joining them together to form a coherent web with a binder. Past binders have preformed this function well. From an environmental standpoint, it might be stated that the past binders have performed this function too well in that the binders tended not to degrade and thus the liner remained intact, severely hampering any environmental degradation of the disposable product.

More recently, binder compositions have been developed which are more environmentally responsible and exhibit better water solubility than past binders. Of particular recent interest are binders comprising polymers having inverse solubility in water. It is well known that a number of polymers exhibit cloud points or inverse solubility properties in aqueous media. These polymers have been cited in several publications for various applications, including (1) as evaporation retarders (JP 6207162); (2) as temperature sensitive compositions, which are useful as temperature indicators due to a sharp color change associated with a corresponding temperature change (JP 6192527); (3) as heat sensitive materials that are opaque at a specific temperature and become transparent when cooled to below the specific temperature (JP 51003248 and JP 81035703); (4) as wound dressings with good absorbing characteristics and easy removal (JP 6233809); and (5) as materials in flushable personal care products (U.S. Pat. No. 5,509,913).

One polymer having inverse solubility in water is hydroxypropylcellulose (HPC). Phase transition for HPC occurs at about 40°–44° C., which is substantially higher than the triggering temperature required for a flushable material. As used herein "triggering temperature" is the temperature at which a flushable material rapidly breaks down and disperses into water. In addition, the level of hydration of HPC above the cloud point is high. Without chemical modification, HPC is unsuitable as a binder material in flushable personal care products. However, it has been discovered that with chemical modification, such as methylation, one can lower the transition temperature to that of a triggering temperature and at the same time improve water stability above the triggering temperature.

Methods for methylation of cellulose and cellulose ethers are shown, for example, in U.S. Pat. No. 4,096,325, which discloses a method of making methylated HPC for use as a gelling agent in organic media. Although methylation of HPC is well known in the art, chemical modification of HPC to obtain a desired cloud point is not disclosed. Further, chemical modification of HPC to obtain a triggering temperature in a desirable range of about 23° to 28° C., such that HPC is suitable as a binder material in water-dispersible articles is not disclosed.

HPC has been used in a number of applications. Stafford et al. describes the use of HPC as a temperature sensitive binder in *J. Pharm. Pharmacol.* (1978), 30(1), 1. Other references related to temperature and ion sensitivity of HPC include journal articles such as (1) Philp et al., *Cellul.: Chem., Biochem. Mater. Aspects* (1993), 313; (2) Carlsson et al., *Colloids Surf.* (1990), 47, 147; (3) Harsh, *J. Controlled Release* (1991), 17(2), 175; (4) Chowdhury et al., *Polym. Mater. Sci. Eng.* (1988), 59, 1045; and (5) Nagura et al., *Kobunshi Ronbunshu* (1981), 38(3), 133; and patents such as (1) CA 2100523 AA for ink jet recording; (2) JP 7611081 as a whitening agent; and (3) WO 8706152 as a delivering, removing, or reacting substance.

Although many patents disclose various ion and temperature sensitive compositions for flushable materials, including HPC, there exists a need for flushable products possessing softness, three dimensionality, and resiliency; good fluid wicking properties without the need to add surfactants to the web structure; wicking and structural integrity in the presence of body fluids at body temperature; water-dispersibility at specifically controlled water temperature; and true fiber dispersion after toilet flushing so that fibers do not become entangled with tree roots or at bends in sewer pipes. Such a product is needed at a reasonable cost without compromising product safety and environmental concerns, something that past products have failed to do.

SUMMARY OF THE INVENTION

The present invention is directed to a method of producing methylated hydroxypropylcellulose (m-HPC). By controlling the degree of methylation, one can manipulate the lower critical solution temperature (LCST) of the m-HPC polymer to below room temperature and thereby stabilize the polymer in water above about 21° to 25° C. As used herein, the phrase "lower critical solution temperature" denotes the temperature at which the polymer solution experiences a phase transition going from one phase (homogeneous solution) to a two-phase system (a polymer rich phase and a solvent rich phase) as the solution temperature increases.

The m-HPC materials are particularly useful as binders and structural components for air-laid and wet-laid nonwoven fabrics for water-dispersible products. As used herein, the term "water-dispersible product" means a product which, when exposed to a fluid at a temperature of approximately 22° C. for approximately 2 minutes, dissolves or fragments into pieces all of which will pass through a 20 mesh screen. Some applications include, but are not limited to, applications such as body-side liner, fluid distribution material, fluid in-take material (surge) or cover stock in various flushable personal care products such as diapers, tampons, feminine pads, pantiliners, and wet-wipes.

The temperature and ion responsive, thermoplastic m-HPC polymer of the present invention remains relatively stable in warm water or in dilute aqueous salt solution, such as sodium chloride or sodium sulfate, but dissolves quickly in cold water. The transition temperature is controlled by modifying the level of methylation of the m-HPC structure. Furthermore, water sensitivity or the wet strength of the m-HPC material is improved by incorporating water-insoluble polymers into the material. In addition, the m-HPC polymers can be thermally processed to produce films, fibers, nonwovens. Effects of polymer structure, blend composition and stimuli on the triggerability and mechanical strength of these materials are disclosed.

The present invention is also directed to m-HPC polymers thermally processed to produce films, fibers, and nonwovens. It has been discovered that the m-HPC polymers can be thermally processed using conventional thermal processing equipment such as extruders. Furthermore, the present invention is directed to m-HPC polymers solution processed to provide a number of products. Particular applications of interest are air-laid materials for use in body-side liners, fluid distribution materials, fluid in-take materials (surge) and cover stock for various flushable personal care products containing m-HPC polymers.

The present invention also discloses how to make triggerable nonwovens including coverstock (liner) and intake (surge) materials, which are stable in body fluids having high ionic content or in fluids around body temperature, using unique m-HPC binder compositions. The resultant nonwovens are flushable and water-dispersible due to the tailored LCST or cloud point which is above the temperature of water such as found in a toilet.

DETAILED DESCRIPTION OF THE INVENTION

To be an effective temperature or ion triggerable material suitable for use in flushable personal care products, a material should desirably be (1) functional, i.e., maintain wet strength under controlled conditions and dissolve or disperse rapidly in cold water such as found in a toilet; (2) thermoplastic; (3) safe (not toxic); and (4) economical. One polymer, which meets the above criteria, is methylated hydroxypropylcellulose (m-HPC).

m-HPC is produced by methylation of HPC with methylating agents such as dimethylsulfate or methylchloride. The cloud point of m-HPC is precisely controlled by the degree of methylation. Unlike HPC which, when precipitated in water, forms a supramolecular helical structure along the backbone leading to a very loose, open precipitate with no gel-like property, m-HPC precipitates as a solid mass with a very low level of hydration. This precipitation behavior may be caused by the introduction of methyl groups, which disrupts the helical structure and increases overall hydrophobicity of the polymer chain. m-HPC has cohesive energy and gel strength comparable to poly(N-isopropylacrylamide) (IPAM), above the triggering point. As used herein the phrase "triggering point" or "trigger temperature" refers to the LCST or cloud point temperature.

It should be understood that the present invention is directed to methylated hydroxypropylcellulose (m-HPC), not methylhydroxypropylcellulose (MHPC), a copolymer of methylcellulose and hydroxypropylcellulose. MHPC has a relatively high LCST or cloud point of about 55° to 60° C. and is difficult to thermally process. On the other hand, m-HPC has a LCST or cloud point that can be tailored down to 0° C. and is easily thermally processed.

To illustrate the relationship between cloud point and degree of modification of m-HPC, Table I is provided below:

TABLE I

Methylation and Cloud Point of Selected HPCs

| Sample | Ratio of MeO to OH | CP (°C.) |
| --- | --- | --- |
| m-HPC-1 | 0.53 | 19–22.5 |
| m-HPC-2 | 0.46 | 23–26 |
| m-HPC-3 | 0.44 | 23–28 |
| m-HPC-4 | 0.43 | 23–26.5 |
| m-HPC-5 | 0.39 | 26–31 |
| m-HPC-6 | 0.26 | 31–35 |
| HPC | 0.00 | 44–50 |

Replacement of hydroxyl groups with methoxy groups increases the hydrophobicity of HPC. As a result, the cloud point of m-HPC decreases by increasing the degree of methylation as shown in Table I. Furthermore, since m-HPC has narrow cloud point distributions, one can easily control the solubility of m-HPC at a given solution temperature by varying the amount of methoxy groups on the m-HPC.

Methylation of HPC also increases the water stability of the polymer in aqueous solutions. The level of hydration of m-HPC-5 was measured in deionized water at 40° C. and in 2, 4, and 8 wt % sodium sulfate solutions at ambient temperature. Samples were immersed in water for 4 hours under specific conditions to reach equilibrium. For comparison only, the level of hydration of poly(N-isopropylacrylamide) was also tested under the same conditions. Table II below illustrates the water uptake of the above solutions.

TABLE II

Water Uptake of m-HPC-5 in Aqueous Solutions

| | Water Uptake (gain in wt %) | | | |
| --- | --- | --- | --- | --- |
| Sample | 2 wt % | 4 wt % | 8 wt % | 40° C. + 0% salt |
| m-HPC-5 | 38 | 28 | 17 | 34 |
| IPAM | Dissolved | 35 | 30 | 61 |

As can be seen in Table II, m-HPC-5 has a lower degree of hydration and consequently better water stability than IPAM does under all of the above conditions.

The binding strength of a particularly suitable m-HPC formulation was tested. A solution containing 5 weight percent m-HPC-2 in methanol was applied with a #20 wire-wound rod to a water dispersible wet-laid nonwoven comprising rayon fibers from BFF Nonwovens, Bridgewater Somerset, UK (1.5 denier×25 mm length). The nonwoven was dried in a forced-air oven at 70° C. The "add-on" level was 32–35 wt %. The nonwoven sheet was cut to 1"×4" strips which were then mounted onto a mini-tensile tester with 2" grip separation. The strips and grip were immersed in the following solutions at ambient temperature (approximately 21° to 23° C.): 0.9 wt % sodium chloride solution; 2.0 and 4.0 wt % sodium sulfate solutions; and water at 30° C. for 10 minutes. The samples were also tested in tap water at 23° C. after 30 second immersion. Further, combined effects of temperature and sodium sulfate on the tensile strength were studied using m-HPC-2 in 0.9 wt % sodium chloride solution at 30° C. and in 2 wt % sodium sulfate solution at 30° C. Similar effects were measured on a higher molecular weight isopropylacrylamide (IPAM) sample above 35° C. for comparison. Results are summarized in Table III below.

TABLE III

Effect of Temperature and Salt Solution on Tensile Strength

| Sample | Tap Water | Warm Water | Peak load (g) | | | | |
| --- | --- | --- | --- | --- | --- | --- | --- |
| | | | $0.9\%^1$ | $2\%^2$ | $4\%^2$ | $2\%/30°\ C.^2$ | $0.9\%/30°\ C.^1$ |
| m-HPC-2 | 0 | 110 | 125 | 97 | 136 | 151 | 222 |
| IPAM | 0 | 154 | 0 | 0 | — | — | — |

$^1$sodium chloride aqueous solution
$^2$sodium sulfate aqueous solution

As shown in Table III, m-HPC proved to be an effective temperature and/or ion triggerable binder. m-HPC maintains a tensile strength which is comparable or exceeds that of IPAM above the triggering point; however, m-HPC disperses within seconds in cold tap water. m-HPC may preferably be used as a non-force bearing component in water-dispersible products.

Further, the binding strength of the above m-HPC formulation was comparably tested against a similarly prepared nonwoven using 5 weight percent HPC solution as a binder material. Unlike the m-HPC-2 material which had a wet tensile strength of about 110 grams in warm water, the HPC material exhibited no measurable wet tensile strength in warm water.

The effect of polymer blending on the binding strength and triggerability of m-HPC was determined by solution blending surfactant free poly(vinyl acetate) (PVAc) (MW= 96,000) with m-HPC in methanol. Incorporation of PVAc significantly reduced the level of hydration, but did not affect the triggerability up to about 50 wt %, the triggerability of the blend being solely dependent on the m-HPC component. Although concentration levels of hydrophobic polymers above about 50 wt % are considered within the scope of the present invention, concentrations of this range reduce dissolution rate of the blends in cold water.

To determine the effect of PVAc on the binding strength of m-HPC, 5 wt % blend solutions in methanol were used to apply the blend as a binder to a rayon nonwoven substrate. The application procedure was the same as before. Add-on of about 33 to 35 wt % were obtained. Concentrations of PVAc in these blends were 30, 50 and 70 wt %. As discussed above, the triggering temperature for all the blends remained unaffected. The rate of dispersion was also unaffected for binders with 30 and 50 wt % PVAc. As PVAc content increased to about 70 wt %, it took about 1 minute for the substrate to disperse upon shaking. Binding strength of the blends was tested using the same procedure as before. Results of the testing is given in Table IV below.

TABLE IV

Effect of PVAc on the Binding Strength of m-HPC

| Sample (wt %/wt %) | Peak load in 2 wt % sodium sulfate |
| --- | --- |
| m-HPC-2/PVAc (70/30) | 81 |
| m-HPC-2/PVAc (50/50) | 68 |
| m-HPC-2/PVAc (30/70) | 165 |

The binding strength of m-HPC based blends containing less than 50 wt % of PVAc was lower than that of plain m-HPC. Since m-HPC is not compatible with PVAc due to large difference in molar volume, macro-phase separation was observed in these blends wherein PVAc acted as a filler and contributed little to the wet strength of the binder. However, when PVAc content was over about 50 wt %, PVAc formed continuous phase and dominated the binding property. As a result, the binding strength of the blend increased. For example, the blend with 70 wt % PVAc had a higher tensile strength than 100 wt % m-HPC. However, the blend was still triggerable and the trigger temperature remained unaffected by the PVAc.

Further, the present invention encompasses a variety of blends comprising methylated hydroxypropylcellulose (m-HPC) mixed with one or more hydrophobic polymers. Other suitable hydrophobic polymers for blending with the polymers include, but are not limited to, polystyrene, styrene-acrylonitrile copolymer, acrylonitrile-butadiene-styrene terpolymer, ethylene-acrylic acid copolymer, ethylene-methacrylic acid copolymer, polyolefins grafted with polar functional groups such as acrylic acid, maleic anhydride, etc., polyacrylates, polymethacrylates, polyvinyl butyral, polyurethanes, polyesters, polyamides, poly(ethylene vinyl acetate), and ethylene-vinyl alcohol copolymers. The choice and number of suitable hydrophobic polymers to be blended with polymers is not limited, as long as the resulting blend possesses properties (i.e., ion sensitive solubility, trigger temperature, dispersibility in cold water, etc.) suitable for use in water-dispersible products. Desirably, the amount of hydrophobic polymer in the water-dispersible blend is from about 0 to about 75 weight percent based on the total weight of the polymer mixture in the blend.

The blend formulations of the present invention may contain other components in addition to the above-mentioned triggerable polymers and hydrophobic polymers. In some embodiments, it may be desirable to employ one or more additives such as antioxidants, antistatic agents, blowing agents, compatibilizers, flame retardants, heat stabilizers, impact modifiers, lubricants, ultraviolet stabilizers, processing aids, dispersants, slip agents, etc., as fabricating agents or as modifiers depending on the specific properties desired in the final product. For thermal processability, one or more of the above additives may be particularly suitable with the m-HPC polymer.

The m-HPC polymer compositions of the present invention are highly compatible with a great variety of plasticizers; thus such plasticizers may be incorporated therein to improve such composition characteristics as flexibility and resistance to abrasion. These properties are particularly important when the composition is used as a binder material in connection with items to be worn such as the aforementioned sanitary napkins, diapers and the like. For these purposes, water soluble plasticizers such as glycerol and polyethylene glycol can be used, as well as water-insoluble plasticizers such as castor oil, and the like.

The binder formulations of the present invention can be applied to any fibrous substrate. The binders are particularly suitable for use in water-dispersible products. Suitable fibrous substrates include, but are not limited to, nonwoven and woven fabrics. In many embodiments, particularly personal care products, preferred substrates are nonwoven fabrics due to their absorptivity of fluids such as blood, urine and menses. As used herein, the term "nonwoven fabric" refers to a fabric that has a structure of individual fibers or filaments randomly arranged in a mat-like fashion. Nonwoven fabrics can be made from a variety of processes including, but not limited to, air-laid processes, wet-laid processes, hydroentangling processes, staple fiber carding and bonding, and solution spinning.

The binder formulations are particularly useful for binding fibers of air-laid nonwoven fabrics. These air-laid materials find particularly useful application as body-side liners, fluid distribution materials, fluid in-take materials (surge) and cover stock for various water-dispersible personal care products. The basis weights for these air-laid nonwoven fabrics will range from about 20 to about 200 gram per square meter (gsm). Short fibers of length less than about 15 mm are desirably used to make these flushable products. Surge or in-take materials need better resiliency and higher loft so fibers having a fiber titre of about 3 denier (d) or greater are used to make these products. A desirable final density for the surge or in-take materials is between about 0.025 and about 0.050 grams per cubic centimeter (g/cc). Fluid distribution materials will have a higher density, in the desired range of about 0.10 to about 0.20 g/cc using fibers of lower denier, most desirable fibers having a denier of about 1.5 d or less.

The fibers forming the fabrics above can be made from a variety of materials including natural fibers, synthetic fibers, and combinations thereof. The choice of fibers depends upon, for example, fiber cost and the intended end use of the finished fabric. For instance, suitable fibrous substrates may include, but are not limited to, natural fibers such as cotton, linen, jute, hemp, cotton, wool, wood pulp, etc. Similarly, regenerated cellulosic fibers such as viscose rayon and cuprammonium rayon, modified cellulosic fibers, such as cellulose acetate, or synthetic fibers such as those derived from polyvinyl alcohol, polyesters, polyamides, polyacrylics, etc., alone or in combination with one another, may likewise be used. Blends of one or more of the above fibers may also be used if so desired.

The fiber length is important in producing the fabrics of the present invention. In some embodiments such as flushable products, fiber length is of more importance. The minimum length of the fibers depends on the method selected for forming the fibrous substrate. For example, where the fibrous substrate is formed by carding, the length of the fiber should usually be at least about 42 mm in order to insure uniformity. Where the fibrous substrate is formed by air-laid or wet-laid processes, the fiber length may desirably be about 0.2 to 6 mm. Although fibers having a length of greater than 50 mm are within the scope of the present invention, it has been determined that when a substantial quantity of fibers having a length greater than about 15 mm is placed in a flushable fabric, though the fibers will disperse and separate in water, their length tends to form "ropes" of fibers which are undesirable when flushing in home toilets. Therefore, for these products, it is desired that the fiber length be about 15 mm or less so that the fibers will not have a tendency to "rope" when they are flushed through a toilet. Although fibers of various length are applicable in the present invention, desirably fibers are of a length less than about 15 mm so that the fibers disperse easily from one another when in contact with water, most desirably ranging from about 6 mm to about 15 mm in length.

The fibrous substrate of the present invention may be formed from a single layer or multiple layers. In the case of multiple layers, the layers are generally positions in a juxtaposed or surface-to-surface relationship and all or a portion of the layers may be bound to adjacent layers. The nonwoven web may also be formed from a plurality of separate nonwoven webs wherein the separate nonwoven webs may be formed from single or multiple layers. In those instances where the nonwoven web includes multiple layers, the entire thickness of the nonwoven web may be subjected to a binder application or each individual layer may be separately subjected to a binder application and then combined with other layers in a juxtaposed relationship to form the finished nonwoven web.

The binder composition may be applied to the fibrous substrate by any known process of application. Suitable processes for applying the binder material include, but are not limited to, printing, spraying, impregnating or by any other technique. The amount of binder composition may be metered and distributed uniformly within the fibrous substrate or may be non-uniformly distributed within the fibrous substrate. The binder composition may be distributed throughout the entire fibrous substrate or it may be distributed within a multiplicity of small closely spaced areas. In most embodiments, uniform distribution of binder composition is desired.

For ease of application to the fibrous substrate, the binder may be dissolved in water, or in non-aqueous solvent such as methanol, ethanol, or the like, water being a preferred solvent, to provide solutions containing up to about 25 percent by weight of binder composition solids. As discussed above, plasticizers, such as glycerol, polyethylene glycol, castor oil, and the like, may be added to the solution containing the binder composition, the amount of such plasticizers varying according to the softness desired in the final fabric. Also, perfumes, coloring agents, antifoams, bactericides, surface active agents, thickening agents, fillers and similar additives can be incorporated into the solution of binder components if so desired. Furthermore, other water soluble or water dispersible binding agents such as polyvinyl alcohol or aqueous dispersions of, for example, polyvinyl chloride, polyvinyl acetate, polyacrylates, polymethacrylates, copolymers of acrylates and methacrylates, copolymers of vinyl acetate with ethylene, acrylates and/or methacrylates and copolymers of acrylates and/or methacrylates with vinyl chloride can also be added to the binder composition solution in order to obtain bonded fabrics having various desired properties.

Once the binder composition is applied to the substrate, the substrate is dried by any conventional means. Once dry, the coherent fibrous substrate exhibits improved tensile strength when compared to the tensile strength of the untreated wet-laid or dry-laid substrates, and yet has the ability to rapidly "fall apart", or disintegrate when placed in cold water and agitated. For example, the tensile strength of the fibrous substrate may be increased by at least 25 percent as compared to the tensile strength of the untreated substrate not containing the binder. More particularly, the tensile strength of the fibrous substrate may be increase by at least 100 percent as compared to the tensile strength of the untreated substrate not containing the binder. Even more particularly, the tensile strength of the fibrous substrate may be increased by at least 500 percent as compared to the tensile strength of the untreated substrate not containing the binder.

A desirable feature of the present invention is that the improvement in tensile strength is effected where the amount of binder composition present, "add-on", in the resultant fibrous substrate represents only a small portion, by weight of the entire substrate. The amount of "add-on" can vary for a particular application; however, the optimum amount of "add-on" results in a fibrous substrate which has integrity while in use and also quickly disperses when agitated in cold water. For example, the binder components typically are from about 5 to about 50 percent, by weight, of the total weight of the substrate. More particularly, the binder components may be from about 10 to about 35 percent, by weight, of the total weight of the substrate. Even more particularly, the binder components may be from about 15 to about 25 percent, by weight, of the total weight of the substrate.

As with the amount of "add-on", the density of the resulting fiber substrate should be such that the substrate maintains structural integrity while in use, but quickly disperses when agitated in cold water. Although the density may vary for a given application, generally the fiber substrate will desirably have a density of about 0.01 to about 0.3 grams per cubic centimeter, and most desirably a density of about 0.025 to about 0.2 grams per cubic centimeter.

In one embodiment, the fabric substrates of the present invention may be incorporated into such body fluid absorbent products as sanitary napkins, diapers, surgical dressings, tissues, wet wipes and the like. These products may include an absorbent core, comprising one or more layers of an absorbent fibrous material. The core may also comprise one or more layers of a fluid-pervious element, such as fibrous tissue, gauze, plastic netting, etc. These are generally useful as wrapping materials to hold the components of the core together. Additionally, the core may comprise a fluid-impervious element or barrier means to preclude the passage of fluid through the core and on the outer surfaces of the product. Preferably, the barrier means also is water-dispersible. A film of a polymer having substantially the same composition as the aforesaid water-dispersible binder is particularly well-suited for this purpose. In accordance with the present invention, the polymer compositions are useful for forming each of the above-mentioned product components including the layers of absorbent core, the fluid-pervious element, the wrapping materials, and the fluid-impervious element or barrier means.

Understanding the thermal properties of m-HPC is important in terms of binder formulation, thermal processing, and product performance. Glass transition temperature was estimated by DSC (Differential Scanning Calorimetry) and confirmed by DMA (Dynamic Mechanical Analysis). Stability of m-HPC was determined by TGA (Thermal Gravimetric Analysis). The results are summarized in Table V below.

TABLE V

Comparison of Thermal Properties Between HPC and m-HPC

|  | HPC | m-HPC |
|---|---|---|
| Glass Transition Temperature (°C.) | 85 | 56 |
| Softening Temperature (°C.) | 130 | 100 |
| Decomposition Temperature (°C.) | 205 | 208 |

Compared to HPC, there is a significant drop in the Tg, primarily due to the reduction in the number of hydrogen bonds in m-HPC. Similarly, the softening point changed from 130° C. for HPC to 100° C. for m-HPC. m-HPC is stable up to 208° C. beyond which severe degradation occurs.

To determine the thermal processability of m-HPC, m-HPC polymers were tested to determine the applicability of m-HPC as a structural material such as a film or fiber. The melt rheology of HPC (MW=370,000) and m-HPC-5 was studied on a capillary rheometer. m-HPC-5 was studied at 170° C. while HPC was studied at 190° C. due to higher viscosity. Both polymers showed typical thermoplastic behavior. However, m-HPC has a much lower viscosity than HPC at a given shear rate. For example, at a shear rate of 1000 s$^{-1}$, m-HPC-5 had a melt viscosity of 36 Pa.s while HPC had a melt viscosity of 96 Pa.s. The decrease in viscosity is believed to result from partial loss of hydrogen bonding. This is further supported by the fact that m-HPC-3, which has a higher degree of methylation, is less viscous at 160° C. than m-HPC-5 at 170° C.

Similar to HPC, m-HPC of the present invention is thermally processable. m-HPC can be pressed into a film at about 120° to 200° C. on a Carver hot press. With careful selection of processing conditions, m-HPC can be fed through an extruder. Given its thermal processability, m-HPC can be used to produce triggerable diaper components, such as those discussed above, in film or non-woven fiber form.

Those skilled in the art will readily understand that the binder formulations and fibrous substrates of the present invention may be advantageously employed in the preparation of a wide variety of products, including but not limited to, absorbent personal care products designed to be contacted with body fluids. Such products may only comprise a single layer of the fibrous substrate or may comprise a combination of elements as described above. Although the binder formulations and fibrous substrates of the present invention are particularly suited for personal care products, the binder formulations and fibrous substrates may be advantageously employed in a wide variety of consumer products.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Methylation of HPC

Two approaches were taken to modify HPC. The first approach involved a homogeneous reaction in an acetone/hexane mixture with hexane concentration varying from 0 to 20 volume percent. The second approach involved a heterogeneous reaction in hexane. Examples 1–3 below describe the reaction procedures.

EXAMPLE 1

HPC powder, purchased from Aqualon Company, Wilmington, Del. (70 g, 0.51 mol of hydroxy group) was added to 2100 ml of acetone with vigorous stirring at room temperature. A viscous, hazy solution was formed in about an hour. NaOH (80 g, 2.0 mol) was dissolved in 180 ml of water and about ¼ of the NaOH solution was added dropwise to the HPC solution. The mixture was agitated for 30 minutes. Dimethyl sulfate (140 g, 1.11 mol) and ½ of the NaOH solution were added dropwise from two separate addition funnels simultaneously over a period of 45 minutes. The viscosity initially increased and then decreased during the addition. The reaction was performed for three hours at the end of which the remaining ¼ of the NaOH was added. The reaction was conducted for an additional 30 minutes. The polymer was precipitated in warm water and purified by redissolved in cold water and reprecipitated in warm water. The final product was dried under vacuum. Nearly 100 percent yield was obtained. The cloud point of the resulting polymer was 24°–27° C.

EXAMPLE 2

HPC (10 g, 0.076 mol of hydroxy group) was placed in 60 ml of 30 weight percent sodium hydroxide solution for 30 minutes to get uniform wetting. HPC was lightly pressed to remove excess water and then dispersed in 300 ml of hexane. Dimethyl sulfate (30 g, 0.24 mol) was added dropwise to the slurry at room temperature. The reaction was carried out for six hours. The solvent was removed through air drying. The polymer was washed with warm water and dried under vacuum. The yield was over 99 percent. The cloud point of the resulting polymer was 28°–40° C.

EXAMPLE 3

Modification of HPC with methylchloride was performed in a heterogeneous system. HPC (20 g, 0.15 mol of hydroxy groups) was mixed with 35 g of 57 percent sodium hydroxide solution (20 g of NaOH in 15 ml of water). The mixture was transferred to 200 ml of toluene. The suspension was stirred for one and an half hours until HPC broke to fine particles. Methylchloride (41.2 g, 0.82 mol) in 100 ml of toluene was then added to HPC slurry. The reaction was performed for six hours at room temperature. Toluene was decanted and the product was dried in the air. The dry powder was washed with warm water to remove sodium chloride and unreacted sodium hydroxide, and dried under vacuum. The yield was 100 percent. The cloud point of the resulting polymer was 26°–45° C.

As can be seen in the above examples, a homogeneous system gives a more uniform reaction which leads to narrow cloud point distribution. However, the solid level is often low to avoid high viscosity. It is believed that each particle of HPC is highly swelled in acetone, allowing methylating agent to reach the center of each particle for reaction, but the polymer chains are not fully extended. Hence, the viscosity is manageable for about a 3 weight percent solution of HPC with molecular weight of about 370,000. A rapid dispersion of dimethyl sulfate was achieved with high speed stirring to ensure an even reaction. As a result, all of the m-HPC prepared in acetone have fairly narrow cloud point range, usually within four to five degrees which is very similar to HPC (see Table 1 above). This indicates that methylation in acetone occurs evenly along the polymer chain. Water solubility of acetone adds additional advantage for easy recovery of the polymer.

In order to increase the solid content in the reaction, a hexane/acetone mixture was used to reduce swelling of the particles. It was found that 25 percent hexane can significantly reduce the viscosity of the system so that the modification can be done at about 10 percent concentration without affecting the cloud point distribution.

Heterogeneous modification of HPC achieved a higher solid load. HPC particles were pre-swelled in concentrated sodium hydroxide aqueous solution to create reactive centers on the polymer chain and allow easy penetration of the reagent. The swelled particles were then transferred to hexane or toluene to form a suspended system. The solid load can be about 30 weight percent or higher. Methylating agent can be either dimethyl sulfate or methylchloride. However, the cloud point distribution of the resultant m-HPC is three to four times broader relative to a homogeneous reaction. It is believed that the HPC particles are not fully open. The polymers on the surface have the highest level of modification and the reaction extent decreases towards the center of the particle. In addition, poor solubility of the methylating agents in water also retards the reaction. Elevated temperature which enhances solvation power and higher pressure to force the reagent into the particle are helpful to improve the uniformity of the reaction.

Cloud Point Adjustment By Methylation

Degree of methylation was determined by $^1$H NMR. The peak at ca. 3.5 ppm was assigned to methoxy groups. The degree of methylation was determined by $^1$H NMR as the ratio of the methoxy peak (MeO) to the methyl peak of the hydroxypropyl group (PO) at ca. 1.2 ppm.

Replacement of hydroxy group with methoxy group increases hydrophobicity of HPC. As a result, the cloud point of m-HPC decreases with an increasing degree of methylation.

EXAMPLE 4

Examples 4–9 below demonstrate the effect of methylation on the cloud point of HPC.

Using the homogeneous method of Example 1, 1.0 part per weight (ppw) HPC was reacted with 2.4 ppw NaOH in 6.0 ppw water and with 5.2 ppw dimethyl sulfate in acetone. The degree of methylation was determined to be 0.53. The cloud point range of the resulting polymer, m-HPC-1, was 19° to 22.5° C.

EXAMPLE 5

Using the homogeneous method of Example 1, 1.0 part per weight (ppw) HPC was reacted with 2.4 ppw NaOH in 6.0 ppw water, and 3.7 ppw dimethyl sulfate. The degree of methylation was determined to be 0.43. The cloud point range of the resulting polymer, m-HPC-2, was 23° to 26.5° C.

EXAMPLE 6

Using the homogeneous method of Example 1, 1.0 part per weight (ppw) HPC was reacted with 1.5 ppw NaOH in 4.0 ppw water, and 3.0 ppw dimethyl sulfate. The degree of methylation was determined to be 0.46. The cloud point range of the resulting polymer, m-HPC-3, was 23° to 26° C.

EXAMPLE 7

Using the homogeneous method of Example 1, 1.0 part per weight (ppw) HPC was reacted with 1.5 ppw NaOH in 4.0 ppw water, and 2.8 ppw dimethyl sulfate. The degree of methylation was determined to be 0.44. The cloud point range of the resulting polymer, m-HPC-4, was 23° to 28° C.

EXAMPLE 8

Using the homogeneous method of Example 1, 1.0 part per weight (ppw) HPC was reacted with 1.5 ppw NaOH in 4.0 ppw water, and 2.8 ppw dimethyl sulfate. The degree of methylation was determined to be 0.39. The cloud point range of the resulting polymer, m-HPC-5, was 26° to 31° C.

EXAMPLE 9

Using the homogeneous method of Example 1, 1.0 part per weight (ppw) HPC was reacted with 1.5 ppw NaOH in 4.0 ppw water, and 2.1 ppw dimethyl sulfate. The degree of methylation was determined to be 0.26. The cloud point range of the resulting polymer, m-HPC-6, was 31° to 35° C.

Thermal Processing

The following examples demonstrate film and fiber formation of m-HPC polymer. Film formation of m-HPC was tested on a hot press at 165° C. The polymer successfully produced transparent, flexible films. Furthermore, m-HPC successfully formed fibers very easily when processed through a die of capillary rheometer. The m-HPC fibers possess exceptional strength.

EXAMPLE 10 m-HPC formed a continuous sheet when extruded at 100°, 120°, 180° and 200° C. for zone 1, zone 2, zone 3 and die temperatures, respectively, on an Haake extruder. Molecular weight analysis of samples by GPC (Gel Permeation Chromatography) before and after extrusion suggests that little degradation occurred during the processing. m-HPC with higher molecular weight should provide better film quality.

EXAMPLE 11

Fiber spinning of m-HPC was conducted on a conventional modular spinning line. The heating temperatures were 125°, 150°, and 165° C. for zone 1, zone 2 and zone 3, respectively. The static mixer and die temperatures were 175° C. Polymer came out of the spinning head as continuous fibers with a drawdown speed of 35 m/min. At this speed the average diameter of the fibers was 43 microns. Fibers were quite strong with an average dry strength of 90 g as measured on a Sintech Tensile Tester.

The above disclosed examples are preferred embodiments and are not intended to limit the scope of the present invention in any way. Various modifications and other embodiments and uses of the disclosed water-dispersible polymers, apparent to those of ordinary skill in the art, are also considered to be within the scope of the present invention.

What is claimed is:

1. A binder composition for binding fibrous material into an integral web, said binder composition comprising methylated hydroxypropylcellulose.

2. The binder composition of claim 1, wherein the binder composition has a cloud point of less than about 40° C.

3. The binder composition of claim 2, wherein the binder composition has a cloud point of less than about 31° C.

4. The binder composition of claim 3, wherein the binder composition has a cloud point of less than about 26° C.

5. The binder composition of claim 4, wherein the binder composition has a cloud point of less than about 23° C.

6. The binder composition of claim 2, further comprising at least one hydrophobic polymer.

7. The binder composition of claim 6, wherein the at least one hydrophobic polymer comprises polyvinyl acetate.

8. The binder composition of claim 7, wherein the polyvinyl acetate is present in an amount of up to about 70 weight percent based on the combined weight of m-HPC and polyvinyl acetate.

9. A fibrous substrate comprising:
    at least one fibrous material; and
    a binder composition for binding said at least one fibrous material into an integral web, said binder composition comprising methylated hydroxypropylcellulose (m-HPC).

10. The fibrous substrate of claim 9, wherein the binder composition has a cloud point of less than about 40° C.

11. The fibrous substrate of claim 10, wherein the binder composition has a cloud point of less than about 31° C.

12. The fibrous substrate of claim 11, wherein the binder composition has a cloud point of less than about 26° C.

13. The fibrous substrate of claim 12, wherein the binder composition has a cloud point of less than about 23° C.

14. The fibrous substrate of claim 9, wherein the binder composition further comprises at least one hydrophobic polymer.

15. The fibrous substrate of claim 14, wherein the at least one hydrophobic polymer comprises polyvinyl acetate.

16. The fibrous substrate of claim 15, wherein the polyvinyl acetate is present in an amount of up to about 70 weight percent based on the combined weight of m-HPC and polyvinyl acetate.

17. The fibrous substrate of claim 9, wherein the at least one fibrous material comprises natural fibers.

18. The fibrous substrate of claim 9, wherein the at least one fibrous material comprises synthetic fibers.

19. The fibrous substrate of claim 17, wherein the at least one fibrous material comprises natural fibers and synthetic fibers.

20. The fibrous substrate of claim 9, wherein the fibrous material comprises a nonwoven fabric.

21. A water-dispersible product containing at least one fibrous substrate, wherein the fibrous substrate comprising:
    at least one fibrous material; and
    a binder composition for binding said at least one fibrous material into an integral web, said binder composition comprising methylated hydroxypropylcellulose (m-HPC).

22. The water-dispersible product of claim 21, wherein the binder composition has a cloud point of less than about 40° C.

23. The water-dispersible product of claim 22, wherein the binder composition has a cloud point of less than about 31° C.

24. The water-dispersible product of claim 23, wherein the binder composition has a cloud point of less than about 26° C.

25. The water-dispersible product of claim 24, wherein the binder composition has a cloud point of less than about 23° C.

26. The water-dispersible product of claim 21, wherein the binder composition further comprises at least one hydrophobic polymer.

27. The water-dispersible product of claim 26, wherein the at least one hydrophobic polymer comprises polyvinyl acetate.

28. The water-dispersible product of claim 27, wherein the polyvinyl acetate is present in an amount of up to about 70 weight percent based on the combined weight of m-HPC and polyvinyl acetate.

29. The water-dispersible product of claim 21, wherein the at least one fibrous material comprises natural fibers.

30. The water-dispersible product of claim 21, wherein the at least one fibrous material comprises synthetic fibers.

31. The water-dispersible product of claim 29, wherein the at least one fibrous material comprises natural fibers and synthetic fibers.

32. The water-dispersible product of claim 21, wherein the fibrous material comprises a nonwoven fabric.

33. The water-dispersible product of claim 21, further comprising a fluid impervious film formed from m-HPC.

34. The water-dispersible product of claim 21, wherein the product is a flushable personal care product selected from the group consisting of tampons, feminine pads, pantiliners, diapers, wound dressings, wet wipes, dry wipes, towels and tissues.

35. A water-dispersible thermoformable article comprising methylated hydroxypropylcellulose (m-HPC).

36. The water-dispersible thermoformable article of claim 35, wherein the article comprises at least one fibrous m-HPC material.

37. The water-dispersible thermoformable article of claim 35, wherein the article comprises a m-HPC film.

38. A method of adjusting the cloud point of hydroxypropylcellulose for use as a water-dispersible binder material, said method comprising:

substituting methoxy groups for secondary hydroxy groups on the hydroxypropyl groups of the hydroxypropylcellulose polymer chain.

* * * * *